United States Patent
Schneider et al.

(10) Patent No.: US 6,232,254 B1
(45) Date of Patent: May 15, 2001

(54) METHOD OF CLEANING AND/OR REGENERATING WHOLLY OR PARTIALLY DE-ACTIVATED CATALYSTS FOR STACK-GAS NITROGEN SCRUBBING

(75) Inventors: Gunter Schneider, Bietigheim Bissingen; Jochen Benz, Ludwigsburg; Peter Buck, Neckarsulm, all of (DE)

(73) Assignee: Energie-Versorgung Schwaben AG, Stuttgart (DE)

( * ) Notice: Subject to any disclaimer, the term of this patent is extended or adjusted under 35 U.S.C. 154(b) by 0 days.

(21) Appl. No.: 09/147,477

(22) PCT Filed: Jul. 10, 1997

(86) PCT No.: PCT/EP97/03650

§ 371 Date: Jun. 4, 1999

§ 102(e) Date: Jun. 4, 1999

(87) PCT Pub. No.: WO98/02248

PCT Pub. Date: Jan. 22, 1998

(30) Foreign Application Priority Data

Jul. 12, 1996 (DE) .............................. 196 28 212

(51) Int. Cl.[7] .............................. B01J 20/34; B01J 38/48; B01J 38/06; B01J 8/00; C01B 21/00
(52) U.S. Cl. .............................. 502/22; 502/55; 423/239.1
(58) Field of Search ..................... 502/22, 55; 723/239.1

(56) References Cited

U.S. PATENT DOCUMENTS

| | | | |
|---|---|---|---|
| 4,190,554 | * 2/1980 | Yamauchi et al. | 252/412 |
| 4,210,628 | 7/1980 | Ninomiya et al. | 423/239 |
| 4,572,903 | 2/1986 | Hino et al. | 502/55 |
| 4,729,975 | 3/1988 | Kobayashi | 502/20 |
| 4,849,095 | * 7/1989 | Johnson et al. | 208/254 |
| 5,741,748 | * 4/1998 | Allen et al. | 502/25 |
| 5,817,701 | * 10/1998 | Leviness et al. | 518/700 |
| 5,844,005 | * 12/1998 | Bauman et al. | 518/700 |

FOREIGN PATENT DOCUMENTS

| | | |
|---|---|---|
| 0 136 966 B1 | 1/1989 | (EP) . |
| 0 499 351 A1 | 8/1992 | (EP) . |

\* cited by examiner

*Primary Examiner*—Steven P. Griffin
*Assistant Examiner*—Jonas N. Strickland
(74) *Attorney, Agent, or Firm*—Jones, Tullar & Cooper, P.C.

(57) ABSTRACT

The invention concerns a method of cleaning and/or regenerating wholly or partially de-activated catalysts for stack-gas nitrogen scrubbing, in which the catalysts are treated with a washing and/or regenerating liquid, characterized by the washing or regenerating liquid consisting wholly or in part of demineralized water.

21 Claims, 3 Drawing Sheets

METHOD OF CLEANING AND/OR REGENERATING WHOLLY OR PARTIALLY DE-ACTIVATED CATALYSTS FOR STACK-GAS NITROGEN SCRUBBING

FIELD OF THE INVENTION

The present invention relates to a method for scrubbing and/or regenerating of wholly or partially deactivated catalytic devices for nitrous oxide removal from stack gases, wherein the catalytic devices are treated with a scrubbing, or respectively regeneration fluid.

BACKGROUND OF THE INVENTION

Such catalytic devices are also called SCR (selective catalytic reduction) catalytic devices. The deactivation of such catalytic devices has several different causes, mainly:

Clogging of the honeycomb structure, or respectively the free spaces in the catalytic device. Because of this, the stack gas does not reach the catalytic device and the clogged conduit of the catalytic device is not used for the catalytic reaction. In order to use the installed catalytic material as efficiently as possible, attempts are made to decrease the clogging of honeycomb channels or plate channels by cleaning measures, such as steam blowers in the DENOX installation or manual cleaning actions. In spite of this, some of these honeycombs, or respectively free spaces in the catalytic device, become clogged over time. With some installations the catalyst modules are removed and placed on an appropriate shaking device. The clogs are loosened by the shaking movements. In this way the stack gas again gains access to the catalytic material. The increase in activity does not constitute a regeneration, it only provides access to the clogiged catalytic material. The surface layer being formed during operation remains untouched by this cleaning step.

Worsening of the gas diffusion at the surface of the wall of the catalytic device because of the growth of a thin surface layer of approximately 1 to 100 $\mu$m and clogging of pores. Because of this, the stack gas can only reach the pores of the catalytic material poorly or not at all. The formation of a thin surface layer worsens the chemical transformation of $NO_x$ and $NH_3$ into $N_2$ and $H_2O$, because the gas diffusion into the catalytic material is greatly hampered.

Clogging of the active catalytic centers on the surface of the catalytic devices by means of the accumulation of so-called catalytic poisons, for example As, K, Na. The settling of catalytic poisons, such as arsenic, for example, on the active centers of the catalytic device makes the reaction at these centers impossible and in this way also aids in a reduction of the activities of the catalytic material.

Abrasion of catalytic material by solids, such as fly ash, contained in the stack gas. The catalytic material is reduced because of the loss of catalytic material and therefore of the surface available for the reaction. The abrasion of catalytic material is an irreversible process which results in a permanent loss of activity. The following actions can also simultaneously occur in the course of abrasion by fly ash:

Removal of catalytic material and of an existing surface layer,

Retention of components of the fly ash and therefore formation of a fresh gas diffusion-hindering surface layer.

A method is described in German Patent, DE 38 16 600 C2, in which the regeneration of catalytic devices contaminated by arsenic is described. This method does not take into consideration the portion of the deactivation by a gas diffusion-hindering surface layer. Aqueous solutions of nitric acid, hydrochloric acid, sulfuric acid or acetic acid are employed as the scrubbing suspension in the method according to the noted German Patent. These scrubbing suspensions have the disadvantage that for one they are too expensive and also that the disposal of the acids contaminated by arsenic is elaborate.

A method is described in European Patent, EP 0 136 966 B1, in which initially the dust adhering to the surface is removed with dry steam. The catalytic poisons are then intended to be dissolved and rinsed out in a second step by wet steam with a moisture content of $\leq=0.4$. Drying is performed with dry steam again. In the method in accordance with this European Patent, the thin, gas diffusion-hindering layer is not removed in a first step, instead clogged conduits are merely opened again. This has already been done on a large-scale basis for a long time in the form of socalled dust or soot blowers. The second step of this method can have an activity-increasing effect only with catalytic devices wherein the gas diffusion-hindering layer does not exist over the entire surface or not at all. Also, the generation of large amounts of dry and wet steam is very energy-intensive.

A regeneration method for deactivated catalytic devices is described in Japanese Patent, JP-A-63 147 155, wherein the catalytic devices are removed, placed into a basket, which is suspended in a regeneration treatment tank. A flow of regenerating fluid exts in the tank. The fluid consists of a suspension of an abrasive powder in water or in an acid scrubbing fluid.

Japanese Patent, JP-A-52 027 091, describes a regenerating method, in which catalytic devices with reduced performance are treated with water with a diluted aqueous inorganic acid.

U.S. Pat. No. 4,210,628 describes catalytic devices for nitrogen removal made of pulverulent or granular activated charcoal with catalytic metal additives (W, MO, V, CU, etc.). When the catalytic activity is reduced because of the formation of ammonium sulfate, the pulverulent catalytic products, which have been packed into a column, are regenerated in that either N2 is passed through them at 350° C. or they are washed with hot water at approximately 80° C.

A method for the reactivation of catalytic devices is described in German Patent, DE 30 20 698 C2, which removes the deactivating substances by means of a defined pressure and a defined temperature. Various gases, for example methane, propane, carbon dioxide or argon can be added in the process for optimizing thus method. This method also does not consider the gas diffusion-hindering surface layer.

A great disadvantage of most of the mentioned methods is the fact that they can only be performed in a separate installation. To this end the removal of the catalytic devices and therefore an outage of the installation is required.

SUMMARY OF THE INVENTION

Accordingly, it is an object of the present invention to further develop a method of the type mentioned above in such a way that gas diffusion on the surface of the catalytic devices is again made possible, wherein additionally the clogging of the active centers by catalytic poisons is reversed to the greatest extent possible, and which can be performed inside the nitrogen removal installation without the removal of the catalytic devices.

This object is attained in that the scrubbing, or respectively regenerating fluid is fully desalinated water.

The function of the present invention is based on the dissolution and removal of the surface layer for restoring the gas diffusion and exposing of active centers for the nitrogen-removing reaction of the surface of the catalytic device. In this case the composition of the fluid must be selected in such a way that, along with a small consumption of regenerating suspension, the fastest possible dissolution of the surface layer is achieved. In connection with the regeneration of SCR catalytic devices it has surprisingly been shown to be useful to employ fully desalinated water, for example demineralized water, for dissolving the surface layer. The use of demineralized water as the scrubbing fluid prevents the introduction of catalytic poisons with the scrubbing fluid. In comparison with other possible fluids, demineralized water has the advantage that it is relatively inexpensive and that in most cases it can be produced at the location of the power plant itself. The cleaning and regeneration of the catalytic devices is performed at ambient temperatures, so that no energy is required for heating the fluid. By means of this method it is possible to drastically reduce the number of deactivated cataleptic devices to be disposed. Above all, in large installations for the reduction of nitric oxides, so-called DENOX installations, this method is suitable for regenerating the used and deactivated catalytic devices, i.e. to again increase the reduced catalytic activities, without having to remove them.

An advantageous further development of this method provides, that the catalytic devices are first mechanically cleaned by vacuuming or blowing the deposits out, which is then followed by a scrubbing cycle, which removes the surface layer by means of a regenerating suspension and dissolves the clogs of the active centers to a great extent. It has been shown to be advantageous for the consumption of regenerating suspension if only a small portion of the regenerating suspension is continuously removed and regenerated, i.e. the larger part can be employed in a recirculating operation.

An additional opportunity for reducing the scrubbing water is the use of a suitable abrasive which only removes the surface layer. This method can also be practiced inside the nitrogen removal installation. The abrasive (for example small glass spheres), together with the parts of the gas diffusion-hindering surface layer, can then be disposed of together with the fly ash from the electronic filter.

Further advantageous developments of the present invention are claims.

An exemplary embodiment for the use of a suitable regeneration device will be described in greater detail in what follows, making reference to the attached drawings.

DESCRIPTION OF THE PREFERRED EMBODIMENT

Figures 1, 2:
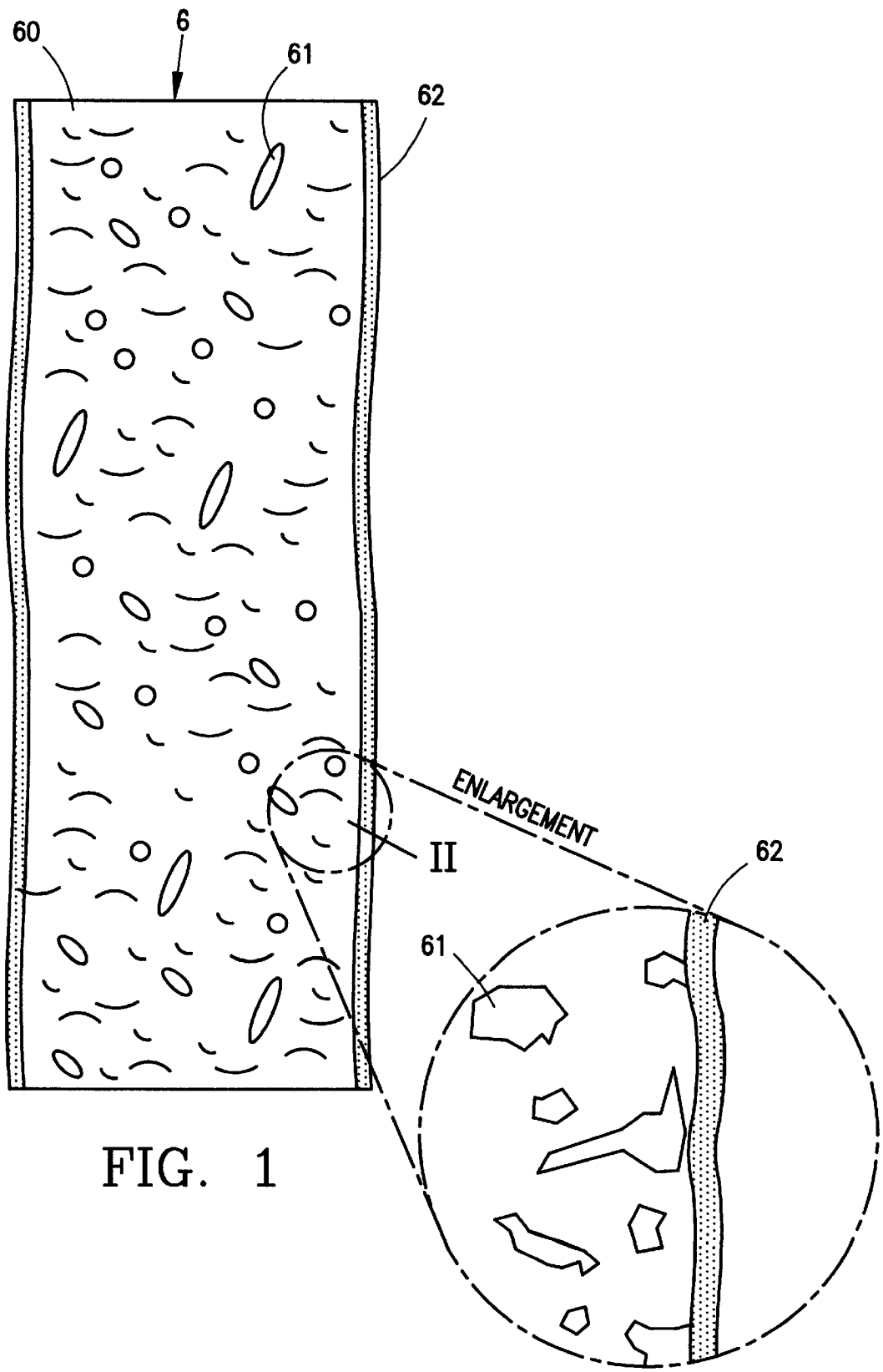
FIG. 1 is a schematic structure of a catalytic device strip with surface layers.
FIG. 2 is an enlargement of a portion of FIG. 1.

FIGS. 1 and 2 show an enlarged sectional view through a catalytic device strip 60 of a catalytic device 6. A catalytic device strip 60 of a honeycomb catalytic device with pores 61 is represented. A surface layer 62 of a thickness of approximately 1 to 100 $\mu$m grows with increasing length of operation which, with increasing thickness hinders, more and more a diffusion of the stack gas to be cleaned into the catalytic material, in particular the pores 61.

Figure 3:
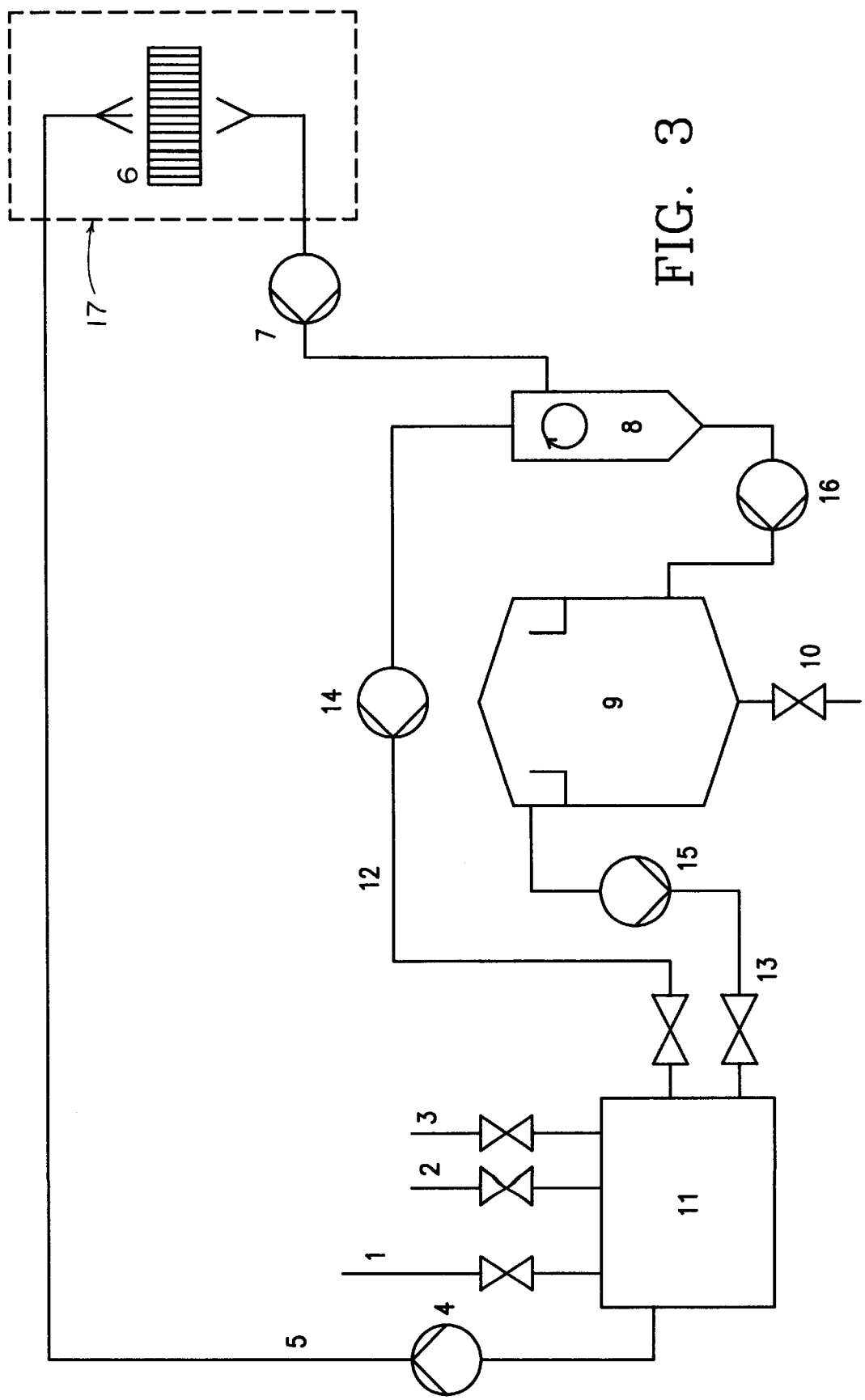
FIG. 3 is a schematic flow graph for the cleaning of catalytic devices inside a DENOX installation.

An exemplary embodiment of the present invention becomes clear by means of the flow graph of the method represented in FIG. 3.

A container 11 is filled with desalted water, for example demineralized water, from the complete desalination installation of a power plant, via a line 1. Additives can be supplied to the scrubbing fluid via lines 2 and 3, for example regenerating substances, such as vanadium, molybdenum or tungsten, for example. A pump 4 conveys the regenerating suspension through a line 5 into the DENOX installation 17, where the catalytic devices 6 are scrubbed. The scrubbing fluid with the materials contained in the surface layer and the catalytic poisons are conducted via a suitable catching device, for example a funnel, and a pump 7 to a separating device 8. There, the materials contained are separated in a suitable manner from the scrubbing fluid. A hydrocyclone, for example, is suitable for this purpose. However, filters or the like are also conceivable. The underflow from the separating device 8, which is heavily loaded with solids, is conveyed via a pump 16 to a settling tank 9. The solid components are further concentrated in this settling tank 9, are drawn off in a partial flow via a line 10, and conveyed to a suitable waste water treatment, not represented here. The overflow of a settling tank 9 and the upper flow of the separating device 8 are conveyed to the container 11 via the lines 12 and 13 and pumps 14 and 15.

This structure can be expanded by suitable precipitation stages, in which dissolved noxious matter, such as the catalytic poison arsenic, for example, is precipitated, so that it can be separated by means of the separating device 8 and removed from the scrubbing fluid. The scrubbing, or respectively regenerating fluid is conveyed in circulation in this way, from which only a defined volume of fluid with the concentrated noxious matter, is removed per circuit. This volume is replenished through the lines 1, 2 and 3.

A further possibility for execution is closing the honeycombs of the catalytic device, or respectively of the reactor, below the catalytic device 6. The catalytic devices are thereafter filled with the scrubbing, or respectively regenerating fluid. During this bath in the regenerating fluid, first the gas diffusion-hindering surface layer is loosened. The catalytic poisons inside the pores of the catalytic device are then loosened from the active centers on the surface of the catalytic device and are transferred into the regenerating fluid. Because of the concentration drop between the regenerating fluid inside the pores of the catalytic device and the regenerating fluid in the honeycomb channels, the dissolved catalytic poisons move to the honeycomb channels. After a defined period of time the regenerating fluid with the components of the gas diffusion-hindering surface layer and the catalytic poisons is drained. The catalytic devices are thereafter dried by means of stack gas or hot air. The advantage of this embodiment lies in the low consumption of regenerating fluid.

Complementing the mentioned exemplary embodiments it is also possible to connect the regeneration of catalytic devices directly with drying. In large nitrogen-removing installations it can occur that tons of regenerating fluid still remain in the catalytic devices 6. The structural steel for receiving the catalytic modules must be designed for this additional weight. This is not the case in some installations. It is then necessary to dry a partial section immediately after the regeneration of this section. In the course of this, the catalytic devices 6 are first regenerated as described. Following regeneration, the regenerated section is dried by means of hot air or hot gas. By means of this the regenerating suspension remaining in the catalytic devices 6 is evaporated and removed.

Figure 4:
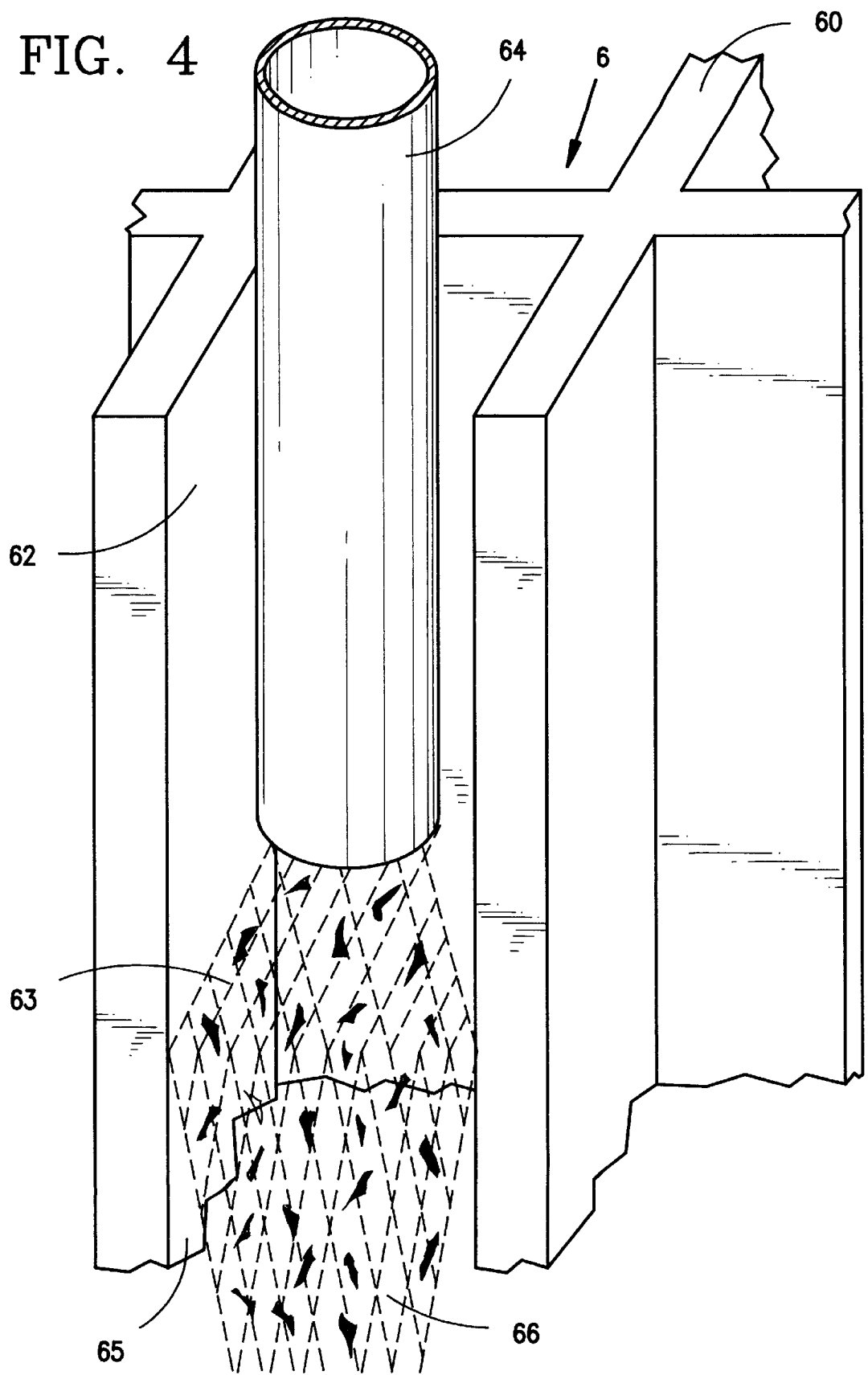
FIG. 4 is a schematic view of the cleaning of the catalytic device by means of an abrasive.

FIG. 4 shows in a schematic representation a complementing option for removing the surface layer 62 from the catalytic devices 6. An abrasive 63, for example sand or glass, is used for mechanically removing the surface layer 62. The abrasive 63 is blasted through a tube 64 or the like on the surface 65 of the catalytic device 6. The abrasive material 66, which has been contaminated with portions of the surface layer, is blown out of the catalytic device 6, or rinsed out during cleaning with the scrubbing fluid, for example.

EXAMPLE

The present invention was tested on used and deactivated catalytic devices. To this end, a deactivated catalytic element of a total length of 840 mm and edges of the length of 150×150 mm was removed from a DENOX installation and treated in accordance with the regenerating method. Prior to regeneration with demineralized water, the catalytic element was examined in a test stand. The catalytic element was thereafter rinsed for 5 minutes with demineralized water and subsequently dried with hot air. A subsequent examination showed that the NOX precipitation rate was increased by approximately 5% to 6% over the entire mol ratio range of $NH_2/NOX$ of 0.8 to 1.2, as shown in the following table.

| Mol ratio $NH_2/NOX$ | 0.8 | 0.9 | 1.0 | 1.1 | 1.2 |
|---|---|---|---|---|---|
| NOX precipitation rate before regeneration | 64.8 | 70.6 | 73.7 | 75.2 | 76.4 |
| NOX precipitation rate after regeneration | 70.4 | 75.8 | 78.9 | 80.6 | 81.8 |

What is claimed is:

1. A method for scrubbing and/or regenerating wholly or partially deactivated catalytic devices used for removing nitrogen from stack gases, comprising the step of:
    treating the deactivated catalytic devices with one of: a scrubbing, and regenerating fluid, wherein un-acidified demineralized water is used as the scrubbing or regenerating fluid.

2. The method as defined in claim 1, further comprising the steps of:
    circulating the scrubbing or regenerating fluid;
    removing a partial flow of scrubbing or regenerating fluid downstream of the deactivated catalytic devices; and
    replacing the removed scrubbing or regenerating fluid with fresh scrubbing or regenerating fluid.

3. The method as defined in claim 1, wherein the demineralized water used is not heated.

4. The method as defined in claim 1, further comprising the step of:
    adding at least one catalytically active component to the scrubbing or regenerating fluid.

5. The method as defined in claim 1, further comprising the step of:
    conducting the scrubbing or regenerating fluid into a nitrogen removal installation, where the deactivated catalytic devices are treated without being removed.

6. The method as defined in claim 5, further comprising the step of:
    catching the scrubbing or regenerating fluid in a separating device.

7. The method as defined in claim 1, further comprising the step of:
    subjecting the deactivated catalytic devices to a bath in the scrubbing or regenerating fluid.

8. The method as defined in claim 1, wherein the deactivated catalytic devices have one of:
    honeycombs and nitrogen removal reactors closed at their bottom, the method further comprising the step of:
        filling the deactivated catalytic devices with the scrubbing or regenerating fluid.

9. The method as defined in claim 1, further comprising the step of:
    introducing the scrubbing or regenerating fluid to the deactivated catalytic devices using one of steam and air blowing devices used for removing flying dust.

10. The method as defined in claim 1, further comprising the step of:
    mechanically cleaning the deactivated catalytic devices prior to treatment with the scrubbing or regenerating fluid.

11. The method as defined in claim 10, wherein dust deposits are removed by said mechanical cleaning using one of blow-through devices and exhaust gas devices.

12. The method as defined in claim 1, further comprising the step of:
    treating the surface of the deactivated catalytic devices with an abrasive agent.

13. The method as defined in claim 1, further comprising the step of:
    cleaning the deactivated catalytic devices with one of air and stack gas following treatment with the scrubbing or regenerating fluid.

14. The method as defined in claim 13, further comprising the step of:
    drying the deactivated catalytic devices immediately following treatment of at least a particle section.

15. A method for the cleaning of the surface of wholly or partially deactivated NOx reduction catalyst to at least partially reactivate such catalyst, such cleaning occurring while such catalyst is operationally positioned in an SCR zone of the path of file gas exiting from a fossil fuel burning facility, comprising the steps of:
    preparing an un-acidified demineralized water based liquid cleaning reagent;
    selectively positioning a movable reagent supply grid upwardly adjacent a portion of a catalyst layer;
    selectively positioning a reagent catch basin downwardly adjacent, and in substantially vertical alignment, with such portion of the catalyst layer;
    directing a portion of such cleaning reagent through such supply grid in a manner that essentially all of such portion of such catalyst layer has reagent passing therethrough and such cleaning reagent is in contact with such portion of such catalyst layer thereof before exiting from such portion of such catalyst layer;
    catching such exiting cleaning reagent in such catch basin;
    recirculating at least a portion of such exiting cleaning reagent from such supply grid a plurality of times, such plurality or times defining a cleaning cycle; and
    discharging such recirculating cleaning reagent for disposal at the end of such cleaning cycle.

16. The method as defined in claim 15, wherein during such directing, catching, and recirculating, the pH value of such cleaning reagent is maintained at substantially no higher than 7.

17. The method as defined in claim 15, further comprising the step of removing at least a portion of solids in suspension in such cleaning reagent, before each step of recirculating.

18. The method as defined in claim 17, further comprising the step of selectively providing additional cleaning reagent to maintain a substantially equal volume throughout the directing portions of the cycle.

19. The method as defined in claim 15, wherein such cleaning reagent is provided at substantially ambient temperature during substantially the entire cleaning cycle.

20. The method as defined in claim 15, further comprising the steps of: repositioning such supply grid and such catch basin to spaced alignment positions with respect to other portions of such catalyst layer; and repeating the cleaning cycle threat and repeating such moving to different portions of such catalyst layer and cleaning threat until substantially the entire catalyst layer has been cleaned in accordance with the method specified.

21. The method as defined in claim 15, further comprising the step of selectively supplying additive to such cleaning reagent in order to enhance the effectiveness thereof during such directing.

* * * * *